United States Patent [19]
Shaffer et al.

[11] Patent Number: 6,128,380
[45] Date of Patent: Oct. 3, 2000

[54] AUTOMATIC CALL DISTRIBUTION AND TRAINING SYSTEM

[75] Inventors: Shmuel Shaffer, Palo Alto; William J. Beyda, Cupertino, both of Calif.

[73] Assignee: Siemens Information and Communication, Networks, Inc., Boca Raton, Fla.

[21] Appl. No.: 09/138,863

[22] Filed: Aug. 24, 1998

[51] Int. Cl.$^7$ ........................................ H04M 3/00
[52] U.S. Cl. ................. 379/265; 379/265; 379/266; 379/309; 434/322; 434/323
[58] Field of Search ...................... 379/210, 212, 379/214, 265, 266, 269, 309; 434/322, 323

[56] References Cited

U.S. PATENT DOCUMENTS

| | | |
|---|---|---|
| 5,384,841 | 1/1995 | Adams et al. . |
| 5,533,115 | 7/1996 | Hollenbach et al. . |
| 5,633,924 | 5/1997 | Kaish et al. . |
| 5,703,943 | 12/1997 | Otto . |
| 5,738,527 | 4/1998 | Lundberg ................................. 434/322 |
| 5,745,109 | 4/1998 | Nakano et al. .......................... 345/340 |
| 5,825,869 | 10/1998 | Brooks et al. ........................... 379/265 |
| 5,827,071 | 10/1998 | Sorensen et al. ....................... 434/323 |

OTHER PUBLICATIONS

Sulkin, Allan, "Industry Analyst Perspective", Siemens Rolm Communications, Inc., 1995.

"ResumeRouting—Precision without compromising efficiency", Siemens Business Communication Systems, Inc., 1998.

*Primary Examiner*—Krista Zele
*Assistant Examiner*—Bing Bui
*Attorney, Agent, or Firm*—Heather S. Vance

[57] ABSTRACT

A system for providing automatic call distribution and training is provided. This system includes agents capable of answering incoming telephone calls. In the preferred embodiment, a queue handler processes the incoming telephone calls to an automatic call distribution system. A monitoring means, such as a server, is used to monitor the queue. It can also monitor agent activities. A contacting means, such as a computer, is used for connecting the agents to the incoming calls. The contacting means also provides training to the agent. Thus, the agents are automatically provided with training based on the queue activity.

22 Claims, 5 Drawing Sheets

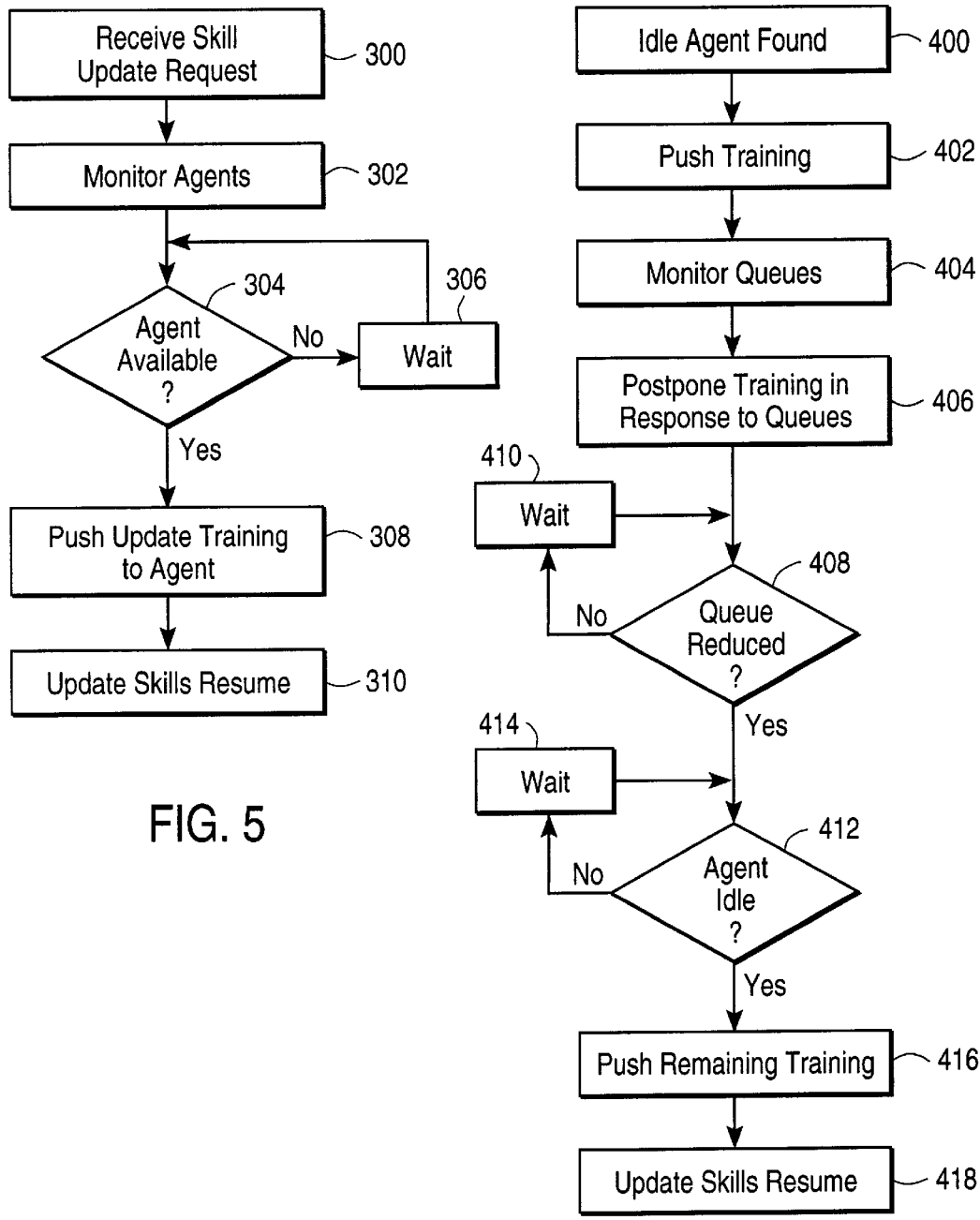

AUTOMATIC CALL DISTRIBUTION AND TRAINING SYSTEM

TECHNICAL FIELD

This invention relates to integrating an automatic call distribution system and a training system, and more particularly to skills based routing in an automated call distribution system integrated with a training system.

BACKGROUND OF THE INVENTION

Automatic call distribution (ACD) systems are used by large businesses to accept incoming calls and to route such calls to agents for communicating with a calling customer. A typical example of an ACD is the system used by airlines to accept calls requesting reservations and tickets. The agents are grouped into teams and any call of a particular type from a particular area of the country is routed to one of these teams by a routing scheme that is sufficiently flexible to select alternate teams according to the time of day, day of week, and amount of traffic to the preferred team. The use of agent teams permits an efficient utilization of agents; queues for agent teams allows the agent teams to be used close to capacity. ACD systems take measurements to keep track of the performance of individual agents and to keep track of the level of traffic load, so a supervisor can add or subtract agents or prepare to order additional agent positions.

Call center communication systems are constantly evolving to meet the changing needs of callers along with the businesses and institutions they are calling. Several years ago, private branch exchange, automatic call distribution (PBX/ACD) systems began to incorporate customer programmable skills-based routing algorithms to improve call distribution among agents with unique skill sets. The ability to match each caller's unique requirements with an agent possessing the necessary skill set to efficiently handle the call was a major improvement over the general purpose agent environment of years past. For example, the ROLM 9751 Release 9006 ACD includes skills-based routing and agent-matching capabilities as part of its FlexRouting call distribution process. This system was one of the first call center routing programs that focused on matching callers and agents, instead of assigning calls to splits or groups. The ROLM 971 Release 9006 ACD is a product currently sold by Siemens Business Communication Systems, Inc. In some cases, some of the functions are also performed by attached servers.

Siemens Business Communication Systems, Inc. also commercially sells a ResumeRouting system, which provides five main functions for the call center operations. First, it collects caller information through combinations of automatic number identification (ANI), dialed number identification service (DNIS), voice mail call processing, interactive voice response (IVR), prompted inputs, and/or customer databases. Second, the ResumeRouting system assigns a skill resume to each call center agent that defines the agent's skill set, skill levels and call handling preferences. Third, it matches each caller's transaction requirements to agent resumes based on skill only, skill/preference, preference only, or preference/skill routing algorithms. Fourth, it empowers call center agents and supervisors via an optional application (e.g., an MS-Windows program) to monitor, reserve or assign specific calls in a queue. Finally, it enables call center systems administration and reporting through a graphical user interface (GUI). This GUI could be, for example, an OS/2 Notebook.

There are many patents which discuss telecommunication networks and/or ACD systems. For example, U.S. Pat. No. 5,533,115 to Hollenbach discloses a network based telephone system which provides coordination of voice and data delivery. In this reference, the system processes a phone call from a caller in a telephone network. The telephone network includes a plurality of switches and an intelligent peripheral for interfacing the plurality of switches to a service control point. The intelligent peripheral then requests that the service control point perform a call processing request. The phone call is then processed according to the call processing request, and the phone call is routed to a selected telephone based on information received from one or more external systems. The received information is also routed to the selected telephone. According to the reference, this provides greater accessibility to information from external systems by a system for processing telephone calls. This also augments the existing process of directing calls to service agents and routes a caller to the appropriate agent based on information about the caller. Finally, the call is routed to the appropriate agent while routing data associated with the call is sent to a display terminal of the same agent.

U.S. Pat. No. 5,633,924 to Kaish discloses a telecommunication network with an integrated network-wide ACD system. In this reference, an intelligent node in the system can access an agent queue that stores data. This data indicates the availability of agent communication terminals to handle the call in a call queue, which stores data concerning calls waiting for ACD service. A database stores processing instructions for the handling of incoming calls based on data contained in the agent and call queues, and in the subscriber specified instructions. The control node is coupled to the agent queue, and the call queue determines the availability of an agent communication terminal to accept a call being held based on data stored in the agent queue. The node then selects the call to be routed to an available agent communication terminal based on the call-waiting data in the call queue and the subscriber handling instructions. The node then sends routing instructions to the switch, and call-waiting time is minimized by efficiently matching individual agent communication terminals with calls awaiting ACD service.

U.S. Pat. No. 5,703,943 to Otto provides for the completion of calls to a preferred agent in an ACD system. In this reference, callers to an ACD system are frequently assigned to a preferred agent for handling their transactions. When these callers call the basic telephone number of the ACD system, they are identified and routed preferably, to the preferred agent if that agent is logged on. Callers can normally be served by the same agent while still having the advantage of having their calls queued to any available agent of the ACD system if the preferred agent for handling a caller or handling a transaction is not available.

What is needed is simplification of the management and training of ACD agents in a skill-based routing system. It is difficult to predict the calling patterns that surround new announcements, product introductions, and the like. For example, one cannot predict how many internationally trained agents an airline will need to handle the calls generated by a fare war on flights to London. A dynamic solution is needed to provide the most efficient use of available resources. In the above described systems, training delivery and call routing are two separate, disconnected functions. A supervisor might notice that certain queues are growing unacceptably long and, in order to compensate, could manually schedule training classes for more employees to learn a desired skill. After the completion of the training, the administrator could manually update the skills of the agents in a skills database. What is needed is an automated solution for addressing the problem of not having enough trained agents for a particular type of call. It is desirable to have both an interactive system that monitors the queue and delivers training automatically, to ensure a balance of trained agents readily available to meet the demands of the incoming calls. It is also desirable to avoid manual intervention and take advantage of worker idle time.

SUMMARY OF THE INVENTION

In the present invention, a system for providing automatic call distribution and training is provided. This system includes agents capable of answering incoming telephone calls. In the preferred embodiment, a queue handler processes the incoming telephone calls to an automatic call distribution system. A monitoring means, such as a server, is used to monitor the queue. It can also monitor agent activities. A contacting means, such as a telephone or a computer, is used for connecting the agents to the incoming calls. It also provides training to the agent. Thus, the agents are automatically provided with training based on the queue activity.

The present invention also provides a method for providing automatic call distribution and training. In this method, the agents in an automatic call distribution system are provided with training, and their skills resumes are updated. The queues containing the incoming telephone calls to the automatic call distribution system are managed, and the training is then delivered to the agents in accordance with the managing of the queues.

The present invention provides training content to agents in their idle time. Optimally, this training, for example, internet style training, matches the statistical demands and needs of the business. When the training is complete, the system automatically updates the skills resumes for the agents who completed the training in real time. Thus, the present invention dynamically delivers training as needed to agents in skills-based routing queues, and it dynamically updates the skills database as the ACD agent completes the training.

BRIEF DESCRIPTION OF THE DRAWINGS

FIG. 5 is a process flow chart for a second embodiment of the present invention; and FIG. 6 is a process flow chart for a third embodiment of the present invention.

DESCRIPTION OF THE PREFERRED EMBODIMENT

Figure 1:
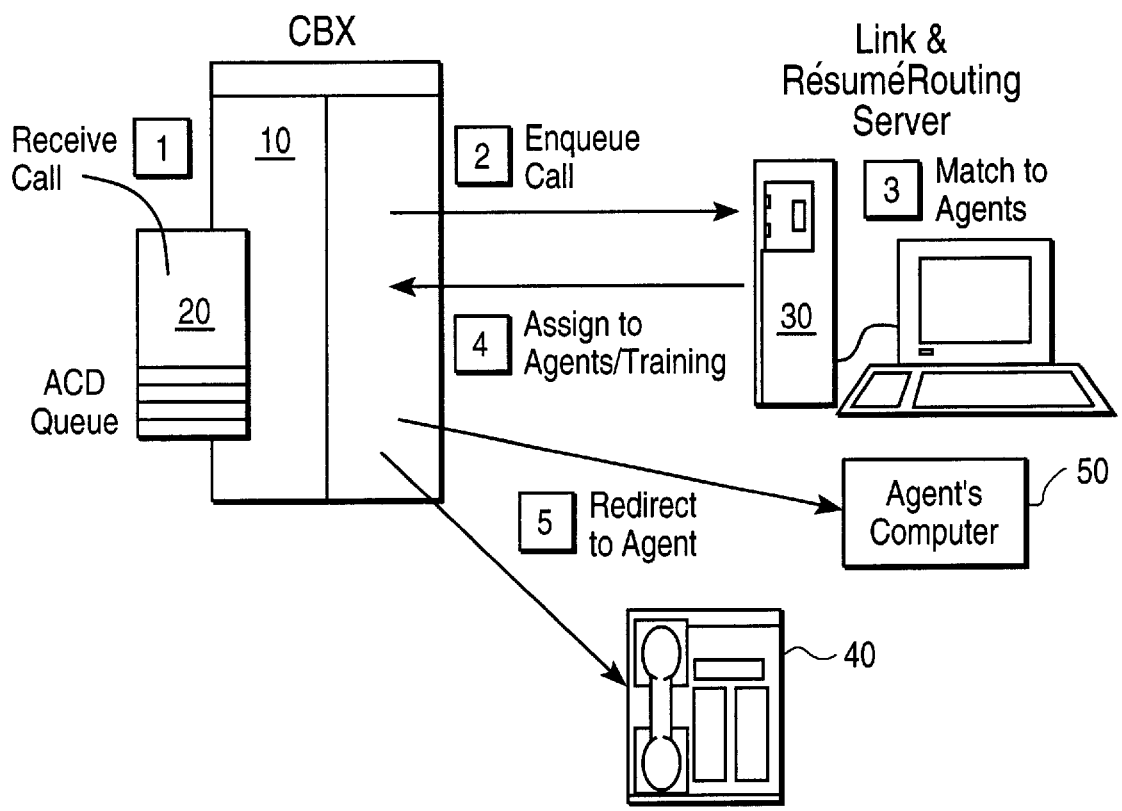
FIG. 1 is an example of basic configuration call flow in an ACD system of the present invention.

FIG. 1 is an example of basic configuration call flow in an ACD system of the present invention. Computerized branch exchange (CBX) 10 contains ACD queue 20. A CBX is a brand of PBX, but any PBX or central office can be substituted. When a call is received by CBX 10, it is placed in ACD queue 20. CBX 10 is also coupled to link and resume routing server 30, agent's telephone 40 and agent's computer 50. In this embodiment of the present invention, server 30 matches the received and enqueued calls to available agents in the ACD. Server 30 then forwards the agent assignment to CBX 10. CBX 10 then redirects the telephone call to agent telephone 40. Associated data, for example, training data, may also be routed to agent's computer 50. With the present invention, server 30 monitors the incoming calls, the current status of agent training and the agent idle time. Based on this information, training requests are sent from server 30 to CBX 10 such that desired training is pushed to agent computer 50 during agent idle time. For example, if server 30 determines that more agents familiar with flights to London are needed based on the types of questions received on incoming telephone calls, then training related to London flights is automatically pushed, internet-style to the idle agents.

The agents can then indicate completion of the training via telephone 40 or computer 50. This information is transferred back to server 30, and the related skills based resume updates are automatically stored. In an alternative embodiment, after a section of training is pushed to an agent, the agent's skills based resume is automatically updated. In this embodiment, the agent does not acknowledge completion of a section of training. The system monitors the training such that completion of the training is automatically noted. In yet another embodiment, exams can be used to confirm completion of training. For example, on-line qualification tests can be administered to agents.

Figure 2:
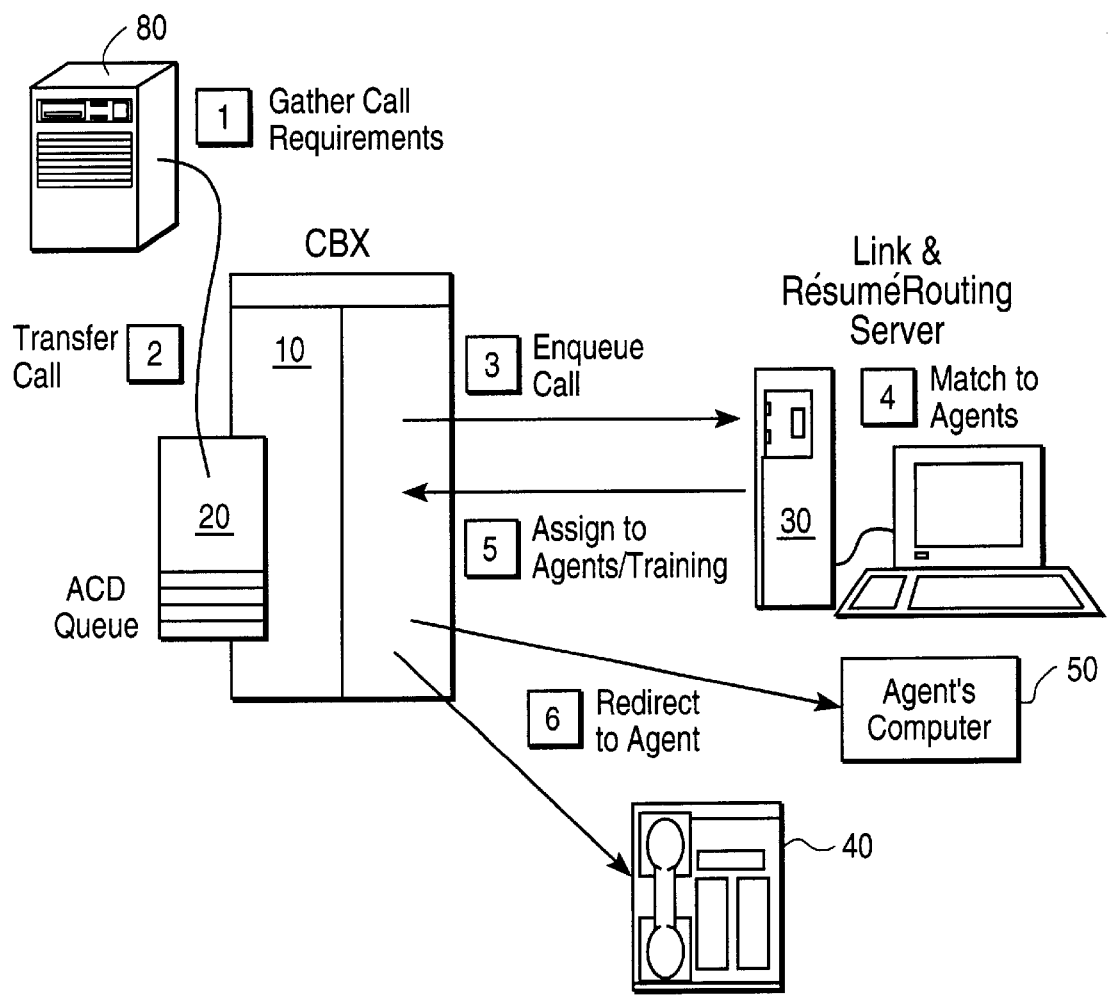
FIG. 2 is an example of a basic configuration call flow with voice mail call processing for an ACD system of the present invention.

FIG. 2 is an example of a basic configuration call flow with voice mail call processing for an ACD system of the present invention. FIG. 2 is substantially the same as FIG. 1 except that a voice mail system is used for call processing. This voice mail system can be stored in, for example, computer 80 which is coupled to ACD queue 20. In this embodiment, the voice mail in computer 80 gathers the call requirements and then transfers the call to ACD queue 20. Additionally, the voice mail system can be used to provide call back requests in the present invention. For example, a caller can be given the option of waiting for an agent, or leaving a detailed voice mail message with a call back request. The estimated waiting time can also be provided to the caller. The caller may prefer to leave a voice mail message if the average wait time is long, for example, 10 minutes. If the caller leaves a message, an agent later listens to this message and provides the call back. If the agent cannot answer the question in the voice mail message, then the agent can either request training on the subject or transfer the voice mail message to another agent for handling.

Figure 3:
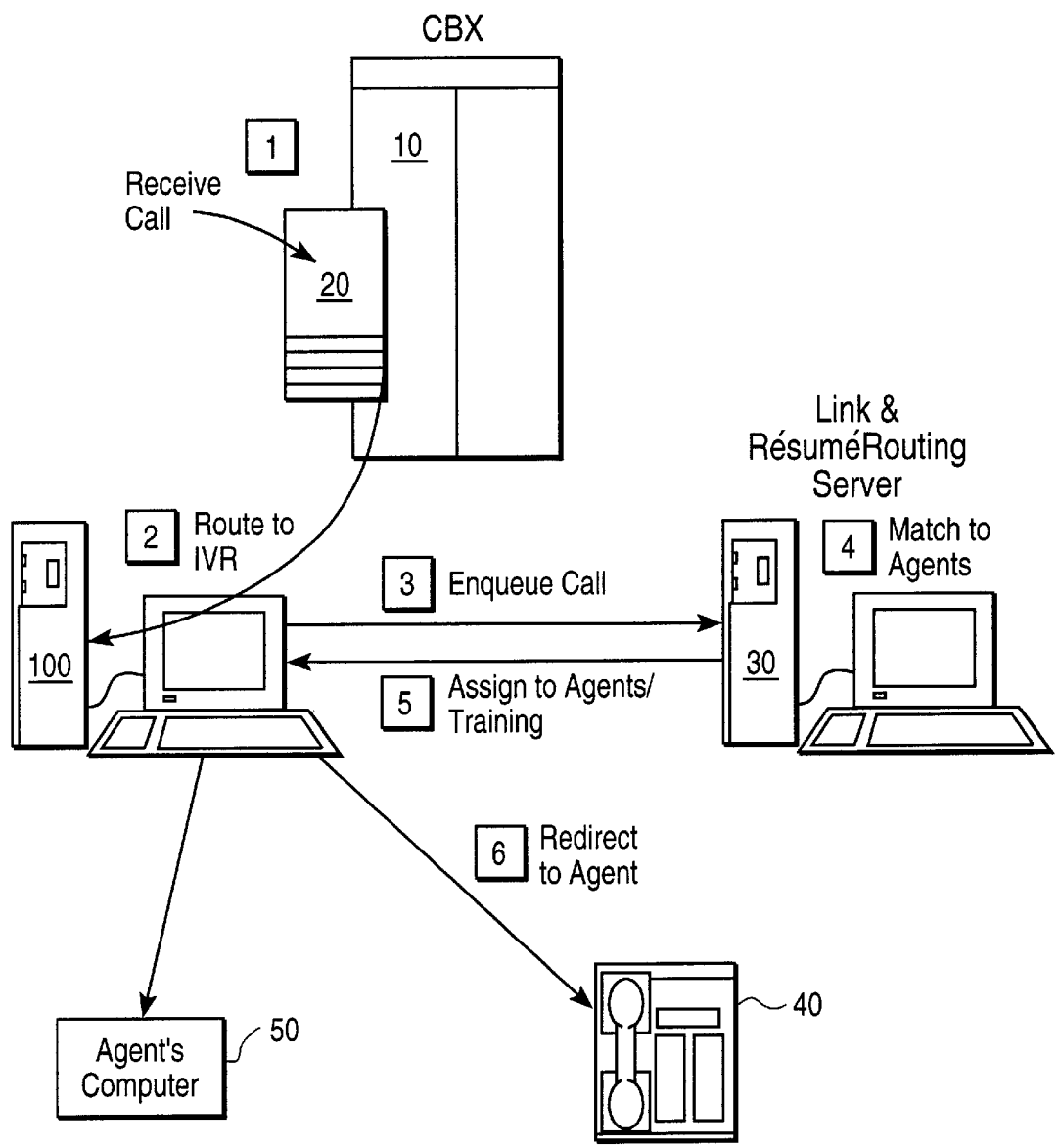
FIG. 3 is an example of a voice enabled configuration call flow in an ACD system of the present invention.

FIG. 3 is an example of a voice enabled configuration call flow in an ACD system of the present invention. FIG. 3 is also substantially similar to FIG. 1. In this embodiment, voice enabled configuration call flow is provided with interactive voice response unit (IVR) 100. Calls are received by ACD queue 20 and then transferred to IVR 100. IVR 100 then communicates with server 30 by sending information related to the enqueued calls along with receiving information related to agent assignment and training. The agent assignment calls are then routed to agent telephone 40 along with the related data, which is sent to agent computer 50. The desired training information is then later sent from IVR 100 to agent computer 50 during the agent idle time. As described above, when the training is complete, the agent's resume is automatically updated.

The IVR 100 can also be used to provide additional features to the present invention. For example, if a caller has a touch tone keypad on their telephone, they can interact with IVR 100 to make specific requests, such as receiving a general, pre-recorded statement providing information about a new medical benefit feature. The caller can also use their touch tone keypad to indicate they want specific information from an agent. An agent available for responding to the call can then determine if they are qualified to provide the requested information before taking the call. If they are not qualified, they can either transfer the call to another agent or they can put the call on hold, for example, for 20 seconds, while receiving training on the requested subject matter. In the preferred embodiment, this training utilizes Internet push technology while the caller is on hold. With Internet push technology, the agent can request additional information related to the subject matter of the training. For example, when a caller is on hold and the agent is receiving training, the Internet push technology can provide the agent with a button stating, for example, "For more information on our new medical benefits feature, press here".

A skills-based routing system optimally has a significant number of agents in a queue. Preferably, at least fifty agents are available to handle the telephone calls in the queue. For example purposes, an ACD system for a benefits center will be described. In this example, fifty agents are available for answering telephone calls in the queue. These telephone calls may be related to, for example, medical benefits, dental benefits, life and accidental insurance, retirement plans and 401K plans. The agents in this example are trained such that at least fifteen have skills for each of the five categories listed in the previous sentence. There is usually overlap where some agents are able to handle calls from more than one area. On October 1, an open enrollment package is mailed to all the employees of the company in this example. This enrollment package includes some significant changes to the medical benefits. In response, the ACD system is flooded with forty-five calls and thirty of the people calling are put on hold. Thirty-five of the agents in our example are not trained in medical benefits and therefore are idle. In the preferred embodiment of the present invention, the available agents are categorized into agent groups, and the agent groups are subdivided based on the training levels of the agents and on the size of the queue.

Figure 4:
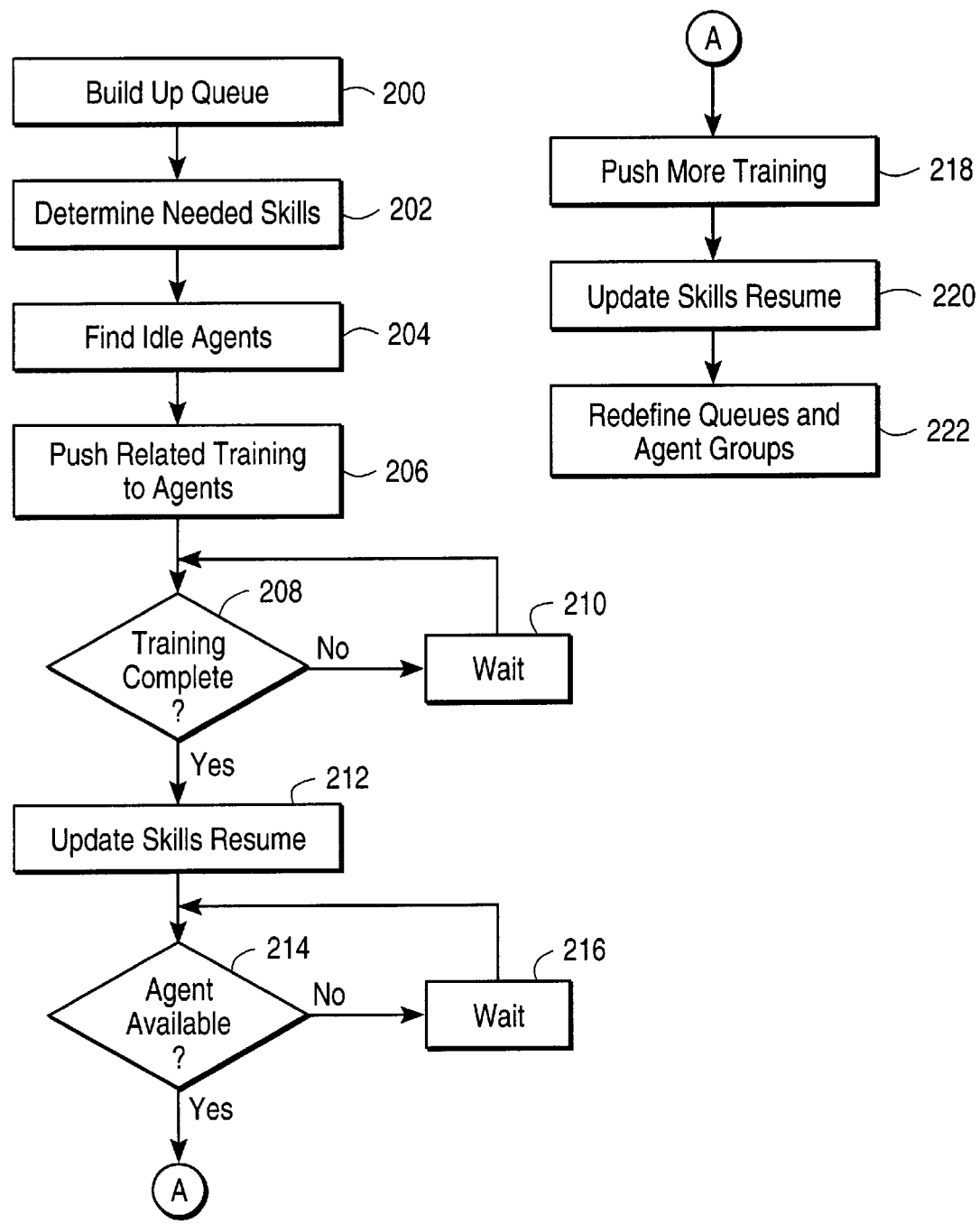
FIG. 4 is a process flow chart for a first embodiment of the present invention.

FIG. 4 is a process flow chart for a first embodiment of the present invention. Using the above example, the present system monitors any build up of telephone calls in the queue at step 200. As set forth above, the queue is preferably located in a PBX. At step 202, the system determines which skills are needed based on the skills of the available agents and on the types of calls in the queue. In the present example, the medical benefits queue is growing out of proportion to the other queues. Thus, the system concludes that additional medical benefits skills are needed for the idle agents. At step 204, the system polls the skills-based routing system for a list of idle agents that do not have the desired medical benefits skills. At step 206, the training system begins to push training content to the agents over, for example, a local area network. In the preferred embodiment, this pushing of training is done Internet-style.

At step 208, the training system checks to see if the agent has completed the training. If the training has not been completed, the system waits at step 210 before checking again. If the training is complete, then the agent's skills resume is updated at step 212. At step 214, the system checks if the agent is available for more training. If there is a call in the queue that the agent can address, the agent takes the call and the system waits at 216 before checking to see if the agent is available again. The amount of time the system waits can be, for example, 5 minutes. Preferably, this wait time can be manually changed. If the agent is available for more training, the system pushes more training to the agent at step 218. Thus, as the agents complete more training, they advance in the program and their skills on their resumes are again updated automatically at step 220.

All of the training does not need to be completed sequentially. For example, someone trained in 401K matters could take a few calls, then take a few minutes for training, etc. Agents serving the other skill areas can be removed from their queues temporarily, so they can receive more training. Thus, all idle time can be filled with training for the most needed skills. As more training is completed, the agent's skills resume becomes more versatile such that the ACD system has more flexibility in handling telephone calls. At step 222, the training system works in tandem with the skills-based routing system to redefine the queues and agent groups. For example, if a large amount of calls are related to a change in a co-payment requirement, the system could first train everyone in the medical benefits queue, and later train the rest of the agents. When a queue is overloaded, the system can switch the calls in this skill area to lesser trained people because most questions are likely to be about the new change. If the question is more advanced, these lesser trained agents can transfer the call to a more highly trained medical benefits queue for further handling.

FIG. 5 is a process flow chart for a second embodiment of the present invention. In this embodiment, the system receives a skill update request at step 300. This request can be generated automatically by the system as a result of its own monitoring, or it can be received externally from a user of the system. At step 302, the system monitors the agents. At step 304, the system checks if an agent is idle and available for training. If the agent is not available, the system waits at step 306 before polling again. If an agent is available, training is pushed to the agent at step 308. When the training is complete, the skills resume for that agent is updated at step 310.

FIG. 6 is a process flow chart for a third embodiment of the present invention. In this embodiment, an idle agent is found at step 400. Desired training is automatically pushed to this idle agent at step 402. At step 404, the system monitors the queues to determine if the idle agent is needed for answering telephone calls. If the queue becomes very full, for example, contains thirty calls, then the idle agent's training is postponed in response to this queue activity at step 406. In the preferred embodiment, the number of calls in the queue required to postpone training is manually set by a system user. The system then checks if the number of calls waiting in the queue has been reduced to, for example, ten calls at step 408. Again, this number of calls is preferably set manually by a user. If the number of calls has not been reduced enough, the system waits at step 410, and then later checks again. If the queue has been reduced enough, the system moves to step 412. At this step, the system checks if the agent whose training was postponed is idle. If the agent is not idle, the system waits at step 414 and checks again later. If the agent is idle, the process moves to step 416. At this step, the remainder of the training is pushed to the agent. After the training is complete, the agent's resume for skills is updated at step 418.

Training during idle time is straightforward. The training becomes more complex when there are calls waiting for agents in the queue. Like the above described embodiment, thresholds can be set to determine which activities take precedence. For example, if the wait time in queue 1 is consistently longer than queue 5, the system will take agents from queue 5 and train them so that they can answer calls from queue 1. These thresholds have been used in the past in call routing system. In these known systems, thresholds determine when a call is routed over a long distance line to another center. While thresholds can be set in the present invention, they are modifiable by the system user. Therefore, the system user decides which customers will be inconvenienced and which will be prioritized over others.

The present invention fills the need for continually improving employee skills while meeting the other needs of the ACD. By dynamically improving the skills of the agents, a multi-tiered system of trained agents can be established and maintained. Since all ACDs continually have new products and information, for example, a new gift catalog or the latest airline fare wars, there is always a need for continual training and skills update. In another embodiment of the present invention, an agent may train themselves by reading web pages describing a product or procedure and can then check off a box on a screen on their computer to indicate they feel the material has been completed and understood. In this manner, they can discuss when to add the skill to their own resume.

In yet another embodiment of the present invention, the training content can also be pushed over a wide area network, for example, the internet, to telecommuters. Telecommuters often need training in new topics and have no convenient way to receive it. Since telecommuting often includes both voice and data access, it is an ideal application for the present invention. In addition, this application would also take advantage of a telecommuter's idle time.

What is claimed is:

1. A method for providing automatic call distribution and training, comprising the steps of:

training agents in an automatic call distribution system;

updating skills resumes for the agents;

monitoring queues, the queues containing incoming telephone calls to the automatic call distribution system;

managing the queues, the managing using the monitoring and determining which of the telephone calls is routed to which of the agents;

wherein the training is delivered in accordance with the managing of the queues.

2. The method for providing automatic call distribution and training of claim 1, wherein the training utilizes an internet, push technology.

3. The method for providing automatic call distribution and training of claim 1, wherein the agents are categorized into agent groups, and wherein the agent groups are subdivided based on training levels of the agents and on the size of the queue.

4. The method for providing automatic call distribution and training of claim 1, wherein thresholds are set for removing agents from call handling and for training the agents after the removal.

5. The method for providing automatic call distribution and training of claim 1, wherein completion of the training is automatically recorded and the skills resume is automatically updated.

6. A method for providing automatic call distribution and training, comprising the steps of:

monitoring a queue, the queue containing incoming telephone calls to an automatic call distribution system;

determining needed skills based on information from the monitoring, the skills being associated with agents in the automatic call distribution system;

training the agents with the needed skills; and updating skills resumes for the agents after the training is complete.

7. The method for providing automatic call distribution and training of claim 6, further comprising the step of locating idle agents, wherein the idle agents are the only agents who receive the training.

8. The method for providing automatic call distribution and training of claim 6, further comprising the step of redefining queues and agent groups based on completed training.

9. The method for providing automatic call distribution and training of claim 6, further comprising the steps of:

receiving manual update requests; and training agents based on the manual update requests.

10. The method for providing automatic call distribution and training of claim 6, further comprising the steps of:

postponing the training when the number of calls in the queue exceeds a first predetermined threshold; and resuming the training when the number of calls in the queue is reduced below a second predetermined threshold.

11. The method for providing automatic call distribution and training of claim 6, wherein the first predetermined threshold and the second predetermined threshold are different.

12. The method for providing automatic call distribution and training of claim 6, wherein the training utilizes Internet, push technology.

13. A system providing automatic call distribution and training, comprising:

a queue handler for processing incoming telephone calls to an automatic call distribution system;

monitoring means for monitoring the queue activity and for monitoring agent activities, the agents capable of answering the incoming telephone calls; and contacting means for connecting the agents to the incoming calls and for providing training to the agent, wherein the agents are automatically provided with training based on the monitoring of the queue activity.

14. The system providing automatic call distribution and training of claim 13, wherein the monitoring means is a server, and wherein the contacting means is at least one of a telephone and a computer.

15. The system providing automatic call distribution and training of claim 13, wherein the training is only provided when the agents are idle.

16. The system providing automatic call distribution and training of claim 13, wherein the queue is stored in a PBX.

17. The system providing automatic call distribution and training of claim 13, wherein the queues and agent groups are redefined based on completed training.

18. The system providing automatic call distribution and training of claim 13, wherein the training is postponed when the number of calls in the queue exceeds a first predetermined threshold, and wherein the training is resumed when the number of calls in the queue is reduced below a second predetermined threshold.

19. The system providing automatic call distribution and training of claim 13, wherein the training utilizes Internet, push technology.

20. The system providing automatic call distribution and training of claim 13, wherein a voice mail system with a call back request feature is utilized.

21. The system providing automatic call distribution and training of claim 13, wherein an interactive voice response unit is utilized.

22. The system providing automatic call distribution and training of claim 13, wherein the agents are categorized into agent groups, and wherein the agent groups are subdivided based on training levels of the agents and on the size of the queue.

* * * * *